Patented Mar. 28, 1950

2,501,831

UNITED STATES PATENT OFFICE 2,501,831

PROCESS TO PRODUCE 2,6-DICHLOR-4-NITROANILINE

George W. Seymour and Victor S. Salvin, Summit, N. J., assignors to Celanese Corporation of America, a corporation of Delaware No Drawing. Application June 7, 1947, Serial No. 753,372

5 Claims. (Cl. 260—578)

This invention relates to the production of the dyestuff intermediate 2,6-dichlor-4-nitro-aniline.

An object of this invention is the provision of an improved process for the production of 2,6-dichlor-4-nitro-aniline whereby said compound is obtained in improved purity and increased yield.

Another object of this invention is the provision of an improved process for the production of 2,6-dichlor-4-nitro-aniline by the chlorination of p-nitro-aniline-ortho-sulfonic acid wherein the formation of tarry oxidation products and undesirable chlorinated impurities, such as 4-nitro-2-chlor-aniline, is held to a minimum.

Other objects of this invention will appear from the following detailed description.

The intermediate 2,6-dichlor-4-nitro-aniline which is employed for the production of azo dyestuffs by diazotization and coupling with a suitable developer may be obtained by the direct chlorination of p-nitro-aniline in a suitable solvent. However, tarry, resinous by-products are formed due to oxidation and, in addition, the product obtained comprises a mixture which contains 4-nitro-2-chlor-aniline as well as the desired 2,6-dichlor-4-nitro-aniline, thus considerably decreasing the yield. The chlorination of p-nitro-aniline-ortho-sulfonic acid in aqueous sulfuric acid solution at a temperature of about 20 to 25° C. or even at 50° C. is an alternative reaction which also yields 2,6-dichlor-4-nitro-aniline. However, under these conditions some chlorine reacts directly to replace the sulfuric acid group, thus forming 4-nitro-2-chlor-aniline. This compound precipitates in the reaction mixture and further chlorination of the same to the desired 2,6-dichlor-4-nitro-aniline is prevented. Not only is the formation of 4-nitro-2-chlor-aniline undesirable for the reason that it decreases the yield of 2,6-dichlor-4-nitro-aniline obtained but also because of the fact that if an appreciable amount of the former is present when diazotization and coupling of the latter is effected during the preparation of azo dyestuffs, the dyestuffs obtained are not as light-fast as those obtained where the intermediate is free, or substantially free, of 4-nitro-2-chlor-aniline. Also the presence of 4-nitro-2-chlor-aniline in the intermediate renders the duplication of shade more difficult.

We have now found that 2,6-dichlor-4-nitro-aniline may be obtained in improved purity and increased yield by the chlorination of p-nitro-aniline-ortho-sulfonic acid if chlorination is initially effected at a temperature of from 0 to 10° C. whereby 2-chlor-4-nitro-aniline-6-sulfonic acid is formed and the temperature then raised to from 50 to 60° C. and the chlorination continued until the desired 2,6-dichlor-4-nitro-aniline precipitates from solution. By effecting the initial mono-chlorination at a relatively low temperature and then completing the chlorination at a higher temperature, higher yields are obtained than when the chlorination is carried out at a uniform temperature. Furthermore, the product obtained by our novel process is substantially free of 4-nitro-2-chlor-aniline, containing at the most about 1 to 2% of this compound.

The p-nitro-aniline-ortho-sulfonic acid may be obtained conveniently by sulfonating p-nitro-aniline with concentrated sulfuric acid. The sulfonic acid obtained may then be chlorinated directly while it is still in solution and without any intermediate separation and purification. Alternatively, the p-nitro-aniline-ortho-sulfonic acid may be obtained by sulfonating p-nitro-chlorbenzene with oleum, precipitating the 5-nitro-2-chlorbenzene sulfonic acid which forms and then reacting the latter with concentrated ammonium hydroxide to form the desired p-nitro-aniline-ortho-sulfonic acid which is then subjected to chlorination in accordance with our novel process.

In order further to illustrate our invention, but without being limited thereto, the following examples are given:

Example I 20 parts by weight of p-nitro-aniline are dissolved in 300 parts by weight of concentrated sulfuric acid (98.7%) and the solution obtained heated at 150° C. for 8 hours. The melt is cooled to 30° C. and drowned in 600 parts by weight of a mixture of ice and water. The aqueous solution of p-nitro-aniline-ortho-sulfonic acid obtained is maintained at 10° C. while a slow stream of chlorine is passed through. After one-half-hour about 12 parts by weight of chlorine are absorbed. The temperature is then raised to 60° C. and the chlorination continued, the end of the reaction being noted by complete precipitation of the 2,6-dichlor-4-nitro-aniline formed. The resulting suspension is filtered and washed. A yield of 87% of theoretical is obtained. The product is free of tarry oxidation products and substantially free of 4-nitro-2-chlor-aniline.

Example II 158 parts by weight of p-nitro-chlorbenzene are dissolved in 600 parts by weight of 20% oleum and the solution heated to 140° C. for 6 hours. The resulting reaction product is cooled and then drowned in 1000 parts by weight of ice and water. The aqueous suspension formed is warmed to 60° C. and 80 parts by weight of sodium chloride are added to salt out the sodium salt of the 5-nitro-2-chlorbenzene-sulfonic acid which is formed. The salt is filtered from solution and washed with 10% aqueous sodium chloride. The wet press cake of 5-nitro-2-chlorbenzene sodium sulfonate is then heated in an autoclave with about 900 parts by weight of concentrated ammonium hydroxide for 5 hours at 130° C. After cooling, the ammoniacal suspension of the p-nitro-aniline-ortho-sulfonic acid formed is filtered and washed with 10% salt solution. The wet press cake obtained is slurried into 3150 parts by weight of 10% aqueous hydrochloric acid, the solution cooled to 5° C. and chlorine gas is then led through the solution for about one hour. About 70 parts by weight of chlorine are absorbed in this period. The temperature is then raised to 60° C. and chlorine gas again led through the solution until precipitation of the 2,6-dichlor-4-nitro-aniline formed is complete. An overall yield of 81% of theory based on the p-nitro-chlorbenzene is obtained, the product being substantially free of 4-nitro-2-chlor-aniline.

Our novel process may also be employed with improved results for the preparation of 2,6-dibrom-4-nitro-aniline by brominating p-nitro-aniline-ortho-sulfonic acid in the manner described above, the initial bromination being effected at a temperature of from 0 to 10° C. and being completed after the temperature has been raised to 50 to 60° C.

It is to be understood that the foregoing detailed description is given merely by way of illustration and that many variations may be made therein without departing from the spirit of our invention.

Having described our invention, what we desire to secure by Letters Patent is:

1. In a process for the production of 2,6-dichlor-4-nitro-aniline by the chlorination of p-nitro-aniline-ortho-sulfonic acid, the steps which comprise chlorinating p-nitro-aniline-ortho-sulfonic acid at a temperature below 10° C. to form 4-nitro-6-chlor-aniline-2-sulfonic acid, raising the temperature above 50° C. and then further chlorinating whereby the sulfonic acid group is replaced and 2,6-dichlor-4-nitro-aniline is formed.

2. In a process for the production of 2,6-dichlor-4-nitro-aniline by the chlorination of p-nitro-aniline-ortho-sulfonic acid, the steps which comprise chlorinating p-nitro-aniline ortho-sulfonic acid in an aqueous inorganic acid medium at a temperature below 10° C. to form 4-nitro-6-chlor-aniline-2-sulfonic acid, raising the temperature above 50° C. and then further chlorinating whereby the sulfonic acid group is replaced and 2,6-dichloro-4-nitro-aniline is formed.

3. In a process for the production of 2,6-dichlor-4-nitro-aniline by the chlorination of p-nitro-aniline ortho-sulfonic acid, the steps which comprise chlorinating p-nitro-aniline-ortho-sulfonic acid in an aqueous inorganic acid medium at a temperature of 0 to 10° C. to form 4-nitro-6-chlor-aniline-2-sulfonic acid, raising the temperature to 50 to 60° C. and then further chlorinating whereby the sulfonic acid group is replaced and 2,6-dichlor-nitro-aniline precipitates from solution.

4. In a process for the production of 2,6-dichlor-4-nitro-aniline by the chlorination of p-nitro-aniline-ortho-sulfonic acid, the steps which comprise chlorinating p-nitro-aniline-ortho-sulfonic acid in dilute aqueous sulfuric acid at a temperature of 0 to 10° C. to form 4-nitro-6-chlor-aniline-2-sulfonic acid, raising the temperature to 50 to 60° C. and then further chlorinating whereby the sulfonic acid group is replaced and 2,6-dichlor-nitro-aniline precipitates from solution.

5. In a process for the production of 2,6-dichlor-4-nitro-aniline by the chlorination of p-nitro-aniline-ortho-sulfonic acid, the steps which comprise chlorinating p-nitro-aniline-ortho-sulfonic acid in dilute aqueous hydrochloric acid at a temperature of 0 to 10° C. to form 4-nitro-6-chlor-aniline-2-sulfonic acid, raising the temperature to 50 to 60° C. and then further chlorinating whereby the sulfonic acid group is replaced and 2,6-dichlor-nitro-aniline precipitates from solution.

GEORGE W. SEYMOUR.
VICTOR S. SALVIN.

REFERENCES CITED

The following references are of record in the file of this patent:

Datta et al. "J. Am. Chem. Soc.," vol. 41, pp. 2028–2038 (1919).